United States Patent [19]
Burel

[11] Patent Number: 5,192,490
[45] Date of Patent: Mar. 9, 1993

[54] EXTENDED RANGE NEUTRON DETECTION DEVICE FOR MONITORING AND CONTROL OF NUCLEAR REACTORS

[75] Inventor: Jean-Pierre Burel, Meylan, France

[73] Assignee: Merlin Gerin, France

[21] Appl. No.: 799,066

[22] Filed: Nov. 27, 1991

[30] Foreign Application Priority Data

Dec. 7, 1990 [FR] France ................................ 90 15462

[51] Int. Cl.⁵ .............................................. G01T 3/00
[52] U.S. Cl. .................................... 376/154; 376/153;
376/155; 376/254; 376/255; 250/390.01;
250/392
[58] Field of Search ............... 376/153, 154, 155, 254,
376/255; 250/390.01, 390.01, 390.03, 390.04,
390.05, 390.06, 390.07, 390.08, 390.09, 390.1,
390.12, 391, 392

[56] References Cited

U.S. PATENT DOCUMENTS

| | | | |
|---|---|---|---|
| 3,311,770 | 3/1967 | Boyd | 313/61 |
| 3,385,988 | 5/1968 | Hyun | 313/61 |
| 3,760,183 | 9/1973 | Neissel | 250/252 |
| 4,044,301 | 8/1977 | Allain et al. | 324/33 |
| 4,582,673 | 4/1986 | Neissel | 376/255 |
| 4,682,036 | 7/1987 | Wakayama et al. | 250/374 |
| 5,002,720 | 3/1991 | Berggren | 376/154 |
| 5,078,951 | 1/1992 | August, Jr. | 376/154 |
| 5,098,639 | 3/1992 | Bacconnet et al. | 376/154 |

FOREIGN PATENT DOCUMENTS 1090781 10/1960 Fed. Rep. of Germany .
2357915 2/1978 France .

Primary Examiner—Donald P. Walsh
Assistant Examiner—Chrisman D. Carroll
Attorney, Agent, or Firm—Parkhurst, Wendel & Rossi

[57] ABSTRACT

A neutron detection device is housed in a metal enclosure containing a first detector with a high-sensitivity fission chamber, and a second detector having a low-sensitivity fission chamber and a boron-lined ionization chamber compensated for gamma radiation. The detection device is useful for extended range measurement of the neutron fluence rate outside the core of a nuclear reactor.

8 Claims, 4 Drawing Sheets

EXTENDED RANGE NEUTRON DETECTION DEVICE FOR MONITORING AND CONTROL OF NUCLEAR REACTORS

BACKGROUND OF THE INVENTION

The invention relates to a detection assembly designed to measure the neutron fluence rate outside the core of a nuclear reactor. The measuring range is very extensive and neutron detection is ensured under normal conditions and under exceptional conditions characterized by a very high gamma dose rate. According to the former art, several detectors had to be used to cover the whole measuring range of the fluence rate levels of a light water reactor. For low levels, proportional counters are used delivering pulses whose count enables the neutron fluence rate to be ascertained. For high levels, ionization chambers are used delivering a current whose measured value is proportional to the fluence rate sought for.

Two types of ionization chambers are used:
a non-compensated ionization chamber to make an accurate measurement at high level; and
an ionization chamber compensated for gamma radiation to ensure continuity of detection between the low level and the high level.

The fission chamber is an ionization chamber filled with gas which enables mainly the thermal neutrons to be detected by reaction on a lining of fissile material, generally formed by uranium 235.

The fission fragments released by the reaction with the thermal neutrons ionize the filling gas and this results in pulses whose count enables the neutron fluence rate to be ascertained. Like all detectors using ionization phenomena in gases, a fission chamber is sensitive to gamma radiation, whose contribution is to be eliminated.

The amplitude of the pulses delivered by the chamber following the reactions of the neutrons with the uranium 235 is much greater than the amplitude of the pulses induced by the reactions of the gamma rays with the detector materials. Using a conventional amplitude discrimination technique, it is possible to count only the pulses caused by the neutrons and to totally eliminate the pulses caused by the gamma rays.

Given that the amplitude of the neutron pulses is much greater than that of the gamma pulses, the fission chamber enables the neutrons to be detected in very high gamma dose rates corresponding to the exceptional conditions envisaged.

The range of use of fission chambers is characteristically defined by the count rate limits which are closely linked to the pulse width. The maximum count rate is limited to $10^6$ counts per second. The minimum count rate is imposed by the statistical limits and corresponds to one count per second. A particularity of fission chambers lies in the wide variety of sensitivities accessible by adjusting the quantity of fissile material introduced into the detector. Fission chamber sensitivities are generally comprised between 4 counts per second per flux unit and $10^{-3}$ counts per second per flux unit. The flux unit (nv) is equal to one neutron per square centimeter and per second.

The boron-lined compensated ionization chamber is a differential chamber formed by three electrodes which define two elementary chambers. The first elementary chamber is located between the positive high voltage polarization electrode and the signal electrode which collects the charges developed by ionization in the gas. The surfaces of the electrodes of this elementary chamber are covered with a boron lining. This elementary chamber is therefore sensitive to neutrons and to gamma rays.

The second elementary chamber is located between the signal electrode and the compensation electrode which receives a negative polarization voltage. As this elementary chamber has no boron lining, it is sensitive to gamma rays only. The ionization currents collected on the signal electrode are eliminated due to their opposing polarizations. The resulting current is mainly the image of the neutron fluence rate sought for.

The upper neutron fluence rate detection limit is imposed by the saturation characteristics, which depend on the surface quantity of sensitive material, the voltage applied and the filling gas.

Adjustment of these parameters enables the upper detection limit, which may reach $10^{11}$ flux units, to be determined. The lower detection limit is imposed by the compensation ratio, the neutron fluence rate and the gamma dose rate.

Under normal conditions, in a pressurized water reactor, the gamma dose rate liable to disturb measurement is about 10 Gy/h. The minimum measurable neutron fluence rate is about $10^4$ NV units.

Under exceptional conditions, it is admitted that the gamma dose rate can reach $10^4$ Gy/h and the compensation ratio can be modified. The range of use is therefore reduced. The lower detection limit is typically about $10^8$ NV.

The use of several types of chambers or counters with independent housings to cover the whole fluence rate measuring range of a light water nuclear reactor gives rise to a problem of dimensions and requires a multitude of connecting cables.

It is preferable to be able to use a detection assembly to:
limit the number of cables;
operate under exceptional conditions; and
increase the measuring range.

SUMMARY OF THE INVENTION

The object of the present invention is to achieve a neutron detection device operating over a wide range, capable of operating in a neutron fluence rate range of 0.1 to $10^{11}$ neutrons per square centimeter and per second (nv), and in the presence of a gamma dose rate of up to $10^5$ Gy/h.

According to a preferred embodiment, the device contains in a single enclosure, of reduced dimensions, a first detector with a high-sensitivity fission chamber, and a second detector with a low-sensitivity fission chamber and a boron-lined ionization chamber compensated for gamma rays, and means for limiting the number of cables and for limiting the power required to polarize the detectors.

A second detector is placed in the enclosure and comprises a differential ionization chamber compensated for gamma rays, having two polarization electrodes and one measuring electrode, delimiting first and second adjacent elementary chambers of positive and negative polarities, the electrodes of the positive part of the first elementary chamber being provided with a first boron lining, whereas at least one of the electrodes of the negative part of the second elementary chamber comprises a second uranium lining so as to form a fission chamber having a lower sensitivity than that of the first detector, and the measuring electrode is connected to a second cable used to transmit a pulse output signal from the second elementary chamber, and/or a current output signal from the first elementary chamber.

The positive polarization electrode of the second detector is connected to the positive voltage source by the first cable so that the first boron-lined elementary chamber of the second detector and the high-sensitivity fission chamber of the first detector use the same power supply of positive polarization. The other negative polarization electrode is connected to a negative voltage source by a third cable. This simultaneous polarization of the two detectors placed in the same enclosure enables the number of connecting cables between the measuring point and the electronic circuit to be limited.

The ionization chamber of the first detector comprises a succession of pairs of positive electrodes nesting between pairs of negative electrodes, each positive or negative electrode being shaped as a metal disk coated with a uranium lining on one of its faces. A moderator element is inserted between two adjacent faces not coated with uranium of each pair of positive or negative electrodes to cause slowing down of the fast neutrons from the reactor. This results in improved detection at low neutron fluence rate level having a high fast component.

BRIEF DESCRIPTION OF THE DRAWINGS

Other advantages and features will become more clearly apparent from the following description of an illustrative embodiment of the invention, given as a non-restrictive example only and represented in the accompanying drawings, in which.

DESCRIPTION OF THE PREFERRED EMBODIMENT

Figure 1:
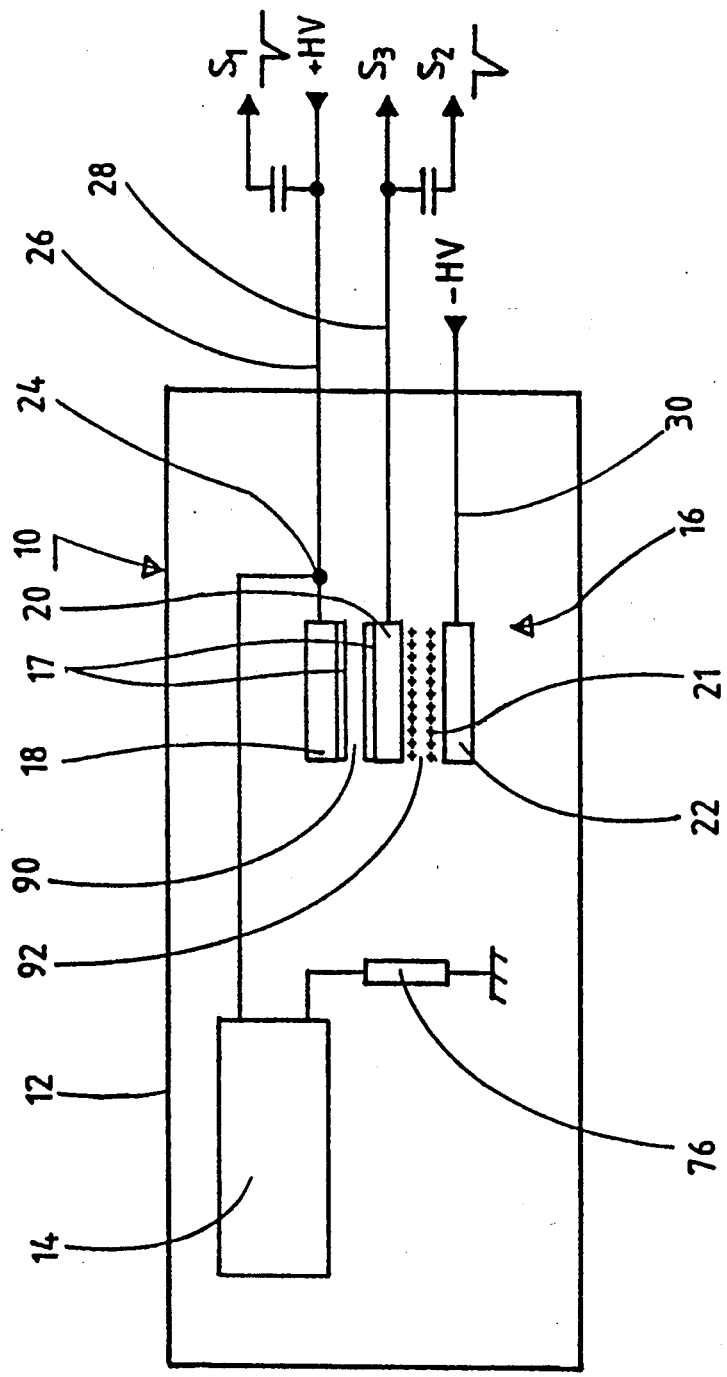
FIG. 1 shows a block diagram of the detector according to the invention.

In FIG. 1, the neutron device 10 comprises a tightly sealed metal enclosure 12 inside which two elementary detectors 14, 16 are fitted independently, arranged to obtain a wide measuring range for control and monitoring of nuclear reactors. The first detector 14 is formed by a uranium-lined fission type ionization chamber, having a great sensitivity, and operating only on pulses. The second detector 16 is formed by a compensated ionization chamber, having two polarizing electrodes 18, 22 and one measuring electrode 20. A first boron lining 17 is arranged on the electrodes 18, 20 of the positive part of the chamber, and a second uranium lining 21 covers at least one of the electrodes 20, 22 of the negative part.

The power supply to the two detectors 14, 16 is from the same positive voltage source (+HV). The two positive electrodes of the detectors 14, 16 are connected to a connection point 24 common to a first positive polarization cable 26. The output signal S1 of the device 10 comes from the pulses transmitted by the first detector 14 via the first cable 26.

The center electrode 20 of the second detector 16 is connected to a second cable 28 in which a signal with two components flows generating:

an output signal S2 representing the pulses produced by the uranium lining 21 placed in the negative part of the chamber; and an output signal S3 representing the current of the boron-lined ionization chamber 17 compensated for gamma radiation.

The electrode 22 of the second detector 16 is connected by a third cable 30 to a negative voltage source (−HV).

Figure 3:
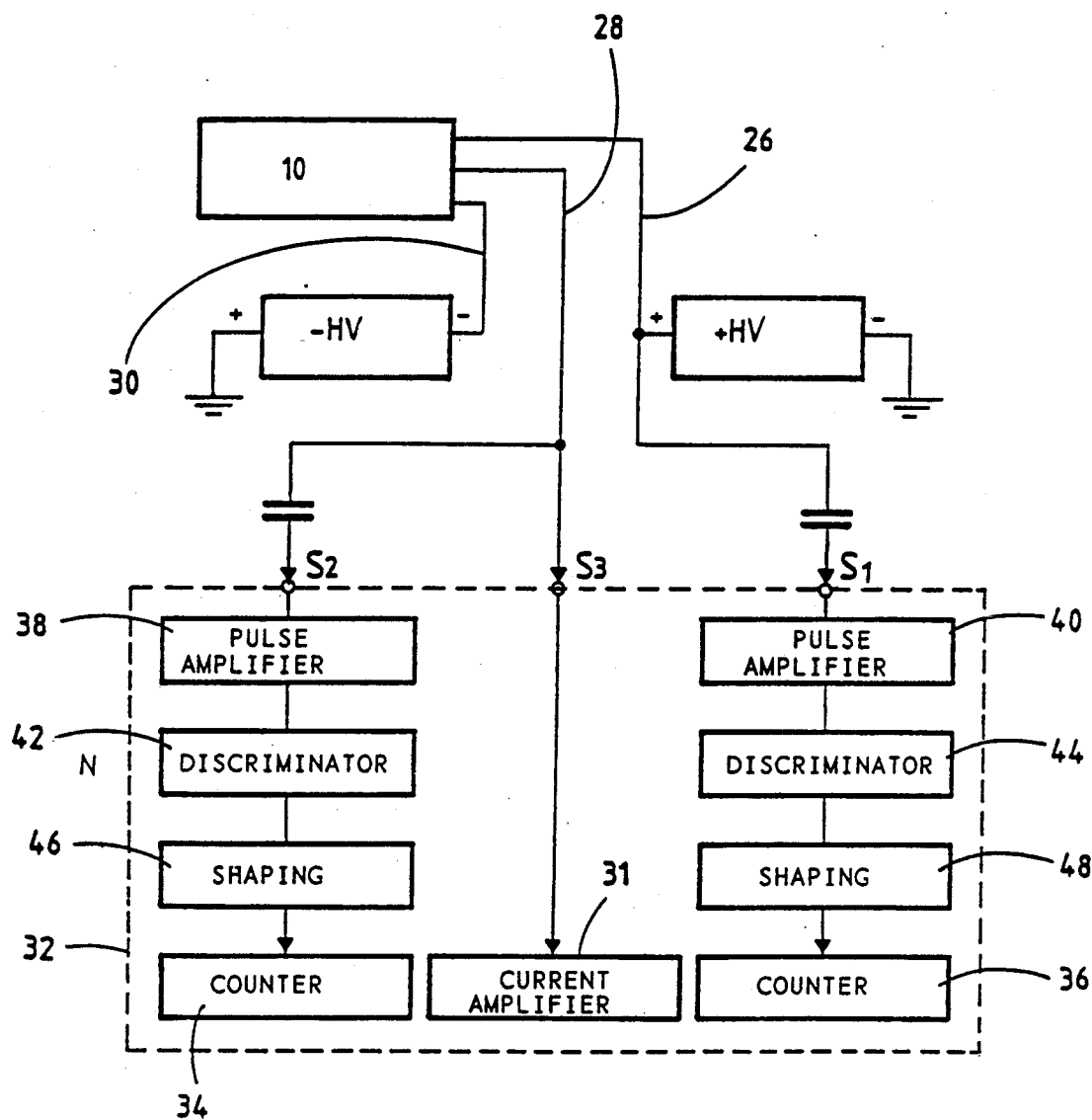
FIG. 3 is a diagram of a neutron detection installation according to the invention.

The three output signals S1, S2, S3 of the neutron detection device 10 are input to an electronic circuit 32 (FIG. 3), which comprises a pulse part to measure the count rate, and a current part to measure the current delivered when the count rate becomes too high. The signal S3 is applied to a current amplifier 31, whereas the pulses of each signal S2 and S1 are counted by a counter 34, 36 after passing through a pulse amplifier 38, 40, a discriminator 42, 44 and a shaping circuit 46, 48.

Figure 2:
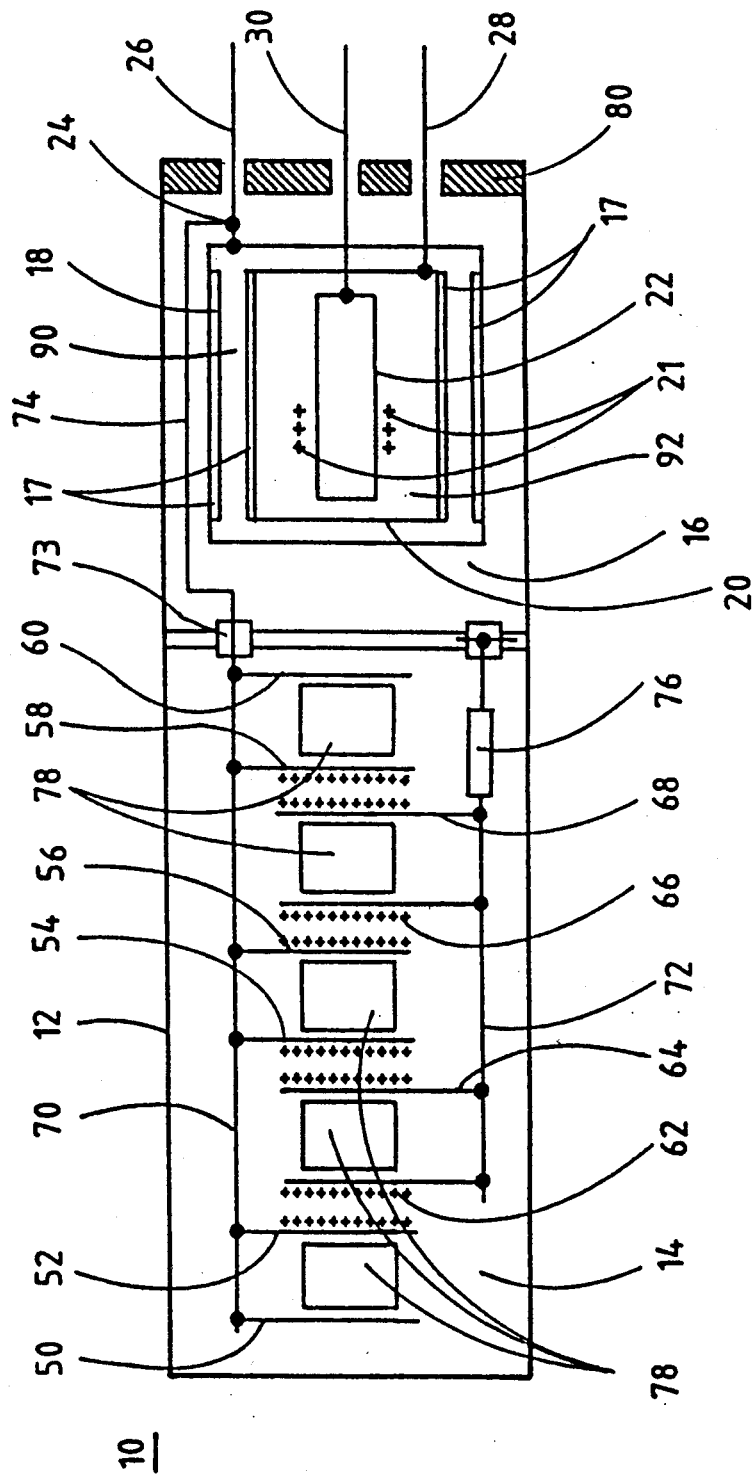
FIG. 2 is a cross section of the detection device on an enlarged scale.

In FIG. 2, the fission type ionization chamber of the first detector 14 comprises a succession of pairs of positive electrodes 50, 52; 54, 56; 58, 60, nesting between pairs of negative electrodes 62, 64; 66, 68, and connected respectively to support rods 70, 72 at positive and negative potential.

The positive potential support rods 70 are fixed on an intermediate insulating base 73 and are electrically connected by a conductor 74 to the connection point 24, so as to be in connection with the positive voltage source (+HV). The negative potential support rods 72 are also supported by the base 73 and connected to the metal enclosure 12 by means of a resistance 76. The metal enclosure 12 acts as voltage reference forming the frame ground. The resistance 76 is designed to limit the current flowing on the positive power supply common to the two detectors 14, 16 when the device 10 is subjected to high fluence rate levels.

Each positive or negative electrode of the first detector 14 has the form of a metal disk coated on one side only with a uranium 235 lining whose thickness does not exceed the range of fission products in uranium. The uranium lining is represented by crosses in FIG. 2. This lining is designed to have the maximum uranium per surface unit and thus to have a good pulse sensitivity. Between the two faces, not lined with uranium, of a pair of positive or negative electrodes, there is located a moderator 78 made of hydrogenated material designed to slow down the neutrons. The pairs of positive and negative electrodes are arranged parallel and alternately on their support rods 70, 72 so as to define a gas space between each of them. The electrode surfaces in contact with the gas of the space are coated with uranium and thus define fission type ionization chambers. The useful signals delivered by the first detector 14 are pulses which are recovered on the cable 26 of positive polarization.

The second detector 16 is a boron-lined ionization chamber compensated for gamma radiation. Instead of using electrodes with plane structures, the chamber comprises three coaxial concentric electrodes 18, 20, 22 fixed on an insulating base 80 with guard rings. The external electrode 18 is positively polarized by the source (+HV) via the first cable 26, the center electrode 20 serves the purpose of collecting the signals, and the internal electrode 22 is negatively polarized by the third cable 30 to compensate the contribution of the gamma rays. The electrodes of the first elementary chamber 90 defined between the external electrode 18 and the center electrode 20 are covered by the first boron lining 17.

The electrodes of the second elementary chamber 92 defined between the center electrode 20 and the internal electrode 22 do not have a boron lining but the internal electrode 22 is coated by the second uranium lining 21 to constitute a small fission chamber. The signals delivered by the measuring electrode 20 comprise pulses and a current.

The neutron detection device 10 is designed to cover the whole measuring range due to the presence of the first and second detectors 14, 16 and of the three connecting cables 26, 28, 30.

Figure 4:
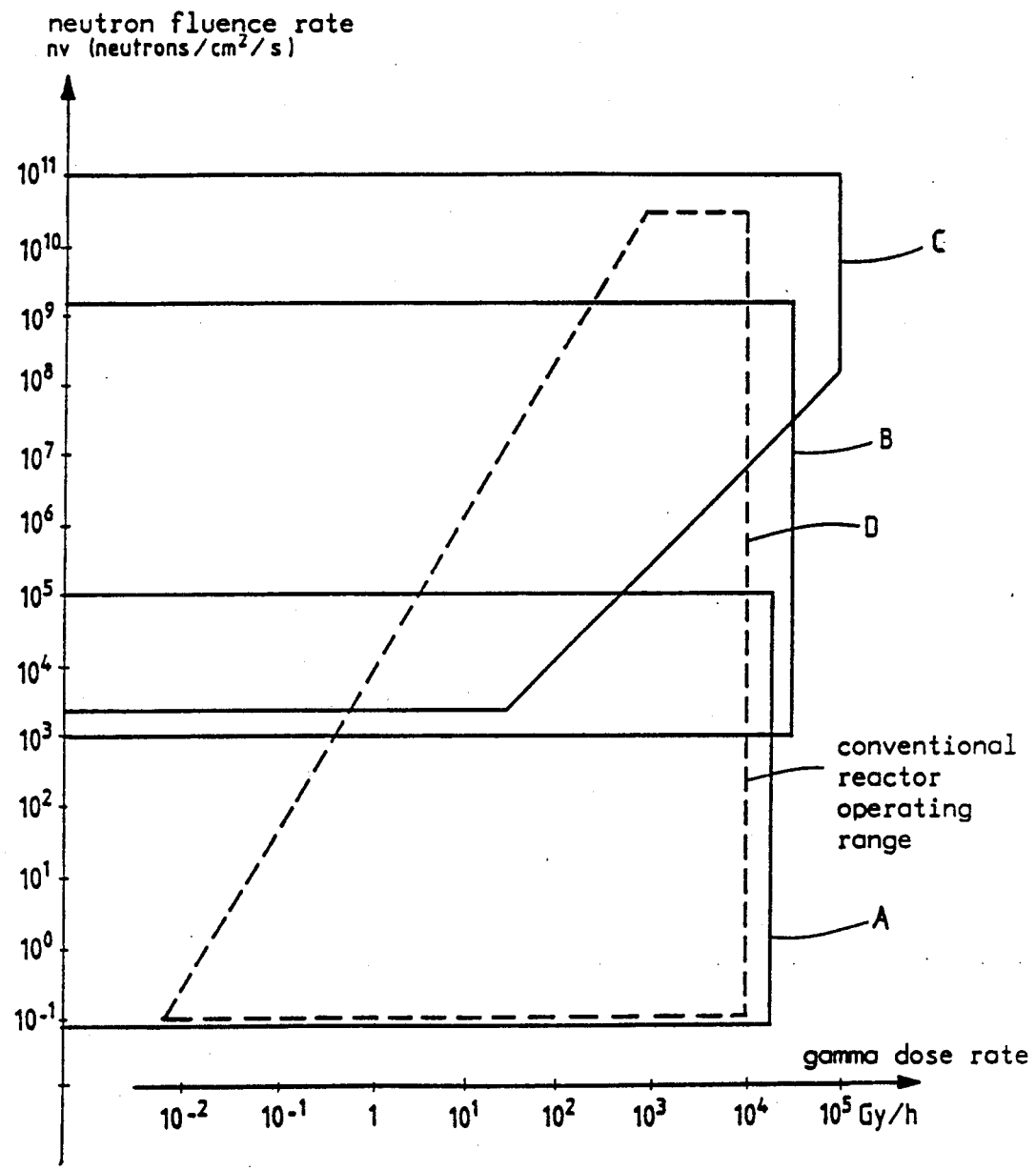
FIG. 4 is a graph showing the fluence rate levels of a nuclear reactor and the ranges of use of the different detectors contained in the assembly.

In FIG. 4, the fluence rate variation (on the y-axis) is comprised between 0.1 and $10^{11}$ neutrons per square centimeter and per second (nv), whereas the gamma dose rate variation (on the x-axis) ranges from 0.01 to $10^5$ Grays/hour (Gy/h). Operation of the assembly covers almost 11 decades and is characterized by three ranges of use of the different chambers contained in the enclosure 12:

a first low level range A extending from 0.1 to $10^5$ nv, using the output signal S1 from the high-sensitivity fission chamber of the first detector 14;

a second range B corresponding to an intermediate level extending from $10^3$ to $10^9$ nv, using the output signal S2 representing the pulses delivered by the low-sensitivity fission chamber of the second detector 16; and the third range C corresponding to a high level extending up to $10^{11}$ nv and $10^5$ Gy/h, using the current signal S3 from the boron-lined chamber of the second detector 16.

It can be noted that the operating range D of the nuclear reactor under exceptional conditions (represented by the broken line in FIG. 4) is well covered by the ranges A, B, C of the neutron detection device 10.

I claim:

1. A neutron detection device for measuring the neutron fluence rate outside the core of a nuclear reactor, said device being housed in a tight enclosure and comprising:

a first detector formed by a uranium-lined fission type ionization chamber, said first detector having a positive electrode polarized by a positive voltage source by means of a first cable, and delivering a pulse output signal applied outside the enclosure to an electronic measuring circuit;

a second detector placed in the enclosure, and comprising a differential ionization chamber compensated for gamma rays, said second detector having two polarization electrodes and one measuring electrode, delimiting first and second adjacent elementary chambers of positive and negative polarities, respectively, the electrodes of said first elementary chamber being provided with a boron lining, whereas at least one of the electrodes of said second elementary chamber comprises a uranium lining so as to form a fission chamber having a lower sensitivity than that of the first detector; and a measuring electrode connected to a second cable used to transmit an output selected from the group consisting of a pulse output signal from said second elementary chamber, and a current output signal from said first elementary chamber.

2. The neutron detection device according to claim 1, wherein said second detector comprises (i) a positive polarization electrode connected to said positive voltage source by said first cable so that the first boron-lined elementary chamber of the second detector and the fission chamber of the first detector use the same power supply of positive polarization, and (ii) a negative polarization electrode connected to a negative voltage source by a third cable.

3. The neutron detection device according to claim 1, wherein a resistance is connected to a negative electrode of the ionization chamber of a first detector to limit the current flowing on the positive power supply in case of a high neutron fluence rate level.

4. The neutron detection device according to claim 3, wherein said enclosure is metal and an opposite end of the resistance is connected to the metal enclosure, which acts as reference voltage by forming a frame ground.

5. The neutron detection device according to claim 3, wherein the ionization chamber of the first detector comprises a succession of pairs of positive electrodes nesting between pairs of negative electrodes, each positive or negative electrode having the form of a metal disk coated on one side with a uranium lining, and a moderator element is inserted between two adjacent faces not coated with uranium of each pair of positive or negative electrodes to cause slowing down of the fast neutrons.

6. The neutron detection device according to claim 5, wherein the different pairs of positive electrodes and negative electrodes are connected respectively to support rods at positive and negative potential, said rods being fixed on an insulating base, and electrically connected respectively to the first cable and the resistance.

7. The neutron detection device according to claim 1, wherein the two polarization electrodes and the measuring electrode of the second detector are coaxial and concentric, and the measuring electrode is arranged concentrically inside the external polarization electrode and concentrically around the internal polarization electrode, said external and internal polarization electrodes being respectively at a positive potential and a negative potential.

8. The neutron detection device according to claim 1, wherein the current output signal is processed by a current amplifier, and each pulse output signal is processed in a counter after passing in a discriminator and a shaping circuit.

* * * * *